United States Patent [19]

Steffes

[11] Patent Number: 4,483,144
[45] Date of Patent: Nov. 20, 1984

[54] CONTROL ARRANGEMENT FOR A HYDRAULIC BRAKE SYSTEM WITH AN ANTISKID CONTROL DEVICE

[75] Inventor: Helmut Steffes, Eschborn, Fed. Rep. of Germany

[73] Assignee: ITT Industries, Inc., New York, N.Y.

[21] Appl. No.: 295,039

[22] Filed: Aug. 21, 1981

[30] Foreign Application Priority Data

Oct. 29, 1980 [DE] Fed. Rep. of Germany ....... 3040601

[51] Int. Cl.³ ............................................. B60T 8/02
[52] U.S. Cl. ..................................... 60/548; 60/563; 60/591; 60/562; 60/566
[58] Field of Search .................... 60/547.1, 548, 563, 60/591, 566, 562; 303/119; 251/63, 324, 282

[56] References Cited

U.S. PATENT DOCUMENTS

| | | | |
|---|---|---|---|
| 3,513,656 | 3/1969 | Engle | 60/588 |
| 3,727,986 | 4/1973 | Koivunen | 60/494 |
| 4,050,748 | 9/1977 | Belart | 303/119 |
| 4,126,996 | 11/1978 | Leiber | 60/554 |
| 4,230,086 | 10/1980 | Lovret | 251/324 |

FOREIGN PATENT DOCUMENTS

| | | |
|---|---|---|
| 2344969 | 3/1974 | Fed. Rep. of Germany ...... 303/119 |
| 2644659 | 4/1976 | Fed. Rep. of Germany . |
| 2838869 | 3/1979 | Fed. Rep. of Germany . |
| 2912025 | 10/1979 | Fed. Rep. of Germany . |
| 3010639 | 9/1981 | Fed. Rep. of Germany . |

Primary Examiner—Robert E. Garrett
Assistant Examiner—Scott L. Moritz
Attorney, Agent, or Firm—James B. Raden; William J. Michals

[57] ABSTRACT

An arrangement for controlling the supply of pressurized hydraulic fluid from a master cylinder and from a pressure source into hydraulic circuits leading to wheel brake actuating cylinders includes a valve device including a control piston acted upon by a spring-loaded auxiliary piston in one direction and by the pressure in a return conduit in the opposite direction. Upon brake pedal depression, hydraulic fluid pressure from the pressure source acts on the auxiliary piston in opposition to the spring force so that the auxiliary piston ceases to act on the control piston. Then, as hydraulic fluid is discharged from the brake actuating cylinders during antiskid control action, pressure builds up in the return conduit and propagates to the control piston to move the same into its open position in which it admits pressurized fluid from the pressure source to check valves which are acted upon in opposition to their opening by the tandem master cylinder pressures. Hence, any fluid discharged during the antiskid control operation is replenished through the check valves from the pressure source, rather than from the master cylinder.

4 Claims, 1 Drawing Figure

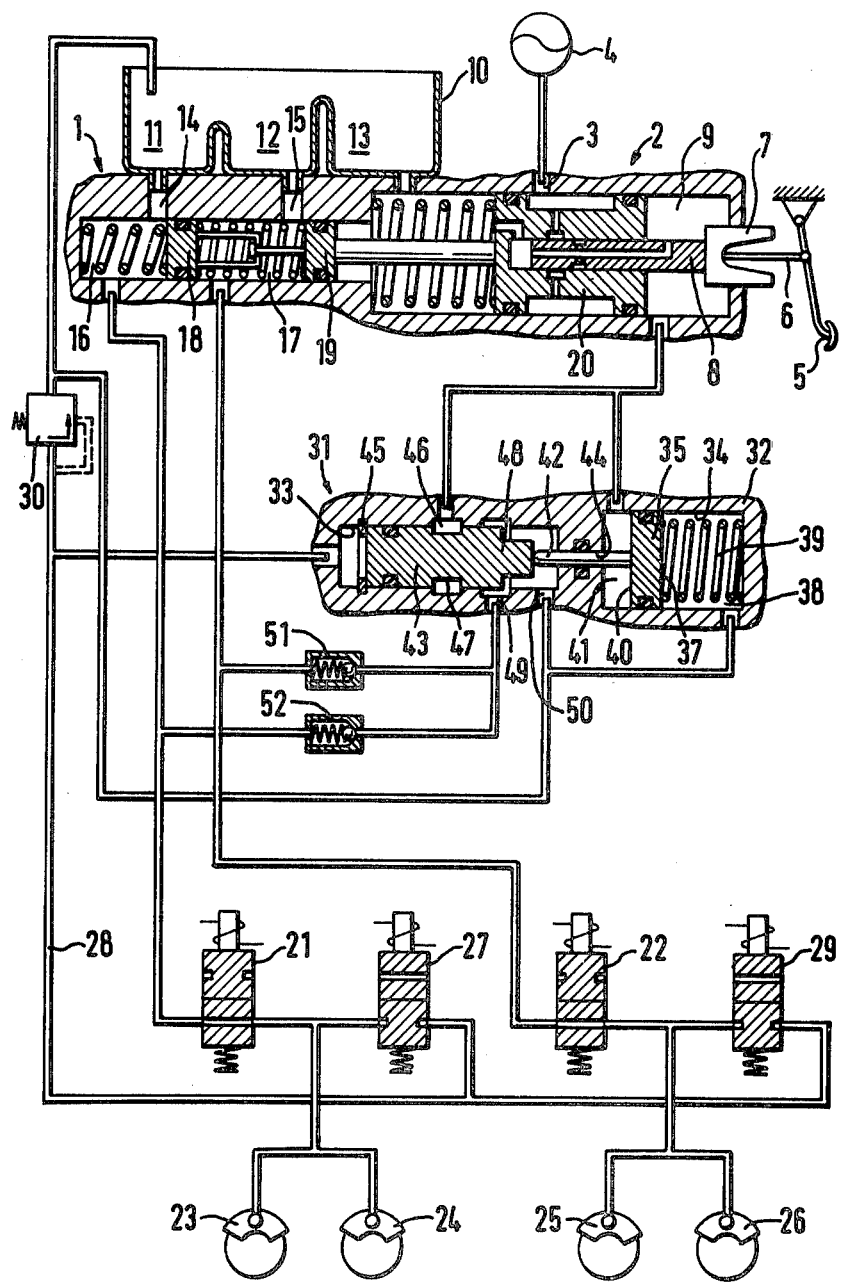

CONTROL ARRANGEMENT FOR A HYDRAULIC BRAKE SYSTEM WITH AN ANTISKID CONTROL DEVICE

BACKGROUND OF THE INVENTION

The present invention relates to a control arrangement for a hydraulic brake system in general, and more particularly for a vehicular braking system equipped with an antiskid device.

A hydraulic brake system of this type usually incorporates a master cylinder and at least one wheel brake actuating cylinder, a pressure control valve connected upstream of the wheel brake actuating cylinder to selectively establish connection between the wheel brake actuating cylinder and the master cylinder or a return reservoir, and a valve device comprising a control piston for supplying pressure fluid from a pressure source into the brake circuits. A braking system of this type is disclosed for instance, in commonly owned German application P 30 10 639.9. This system includes a vacuum brake booster having a tandem master cylinder connected thereto and situated downstream thereof. The working chambers of the tandem master cylinder communicate with wheel brake cylinders via pressure lines and via supply valves which are open in their de-energized state. Furthermore, relief valves which are closed in their de-energized state are assigned to the wheel brake actuating cylinders. The relief valves are open during an antiskid control action in response to control commands of an electronic control unit, so that a rapid pressure decrease can take place in the respective wheel brake actuating cylinders. To prevent the fluid enclosed in the working chambers of the master cylinder from being exhausted during the antiskid control operation, it is necessary to replenish the pressure fluid removed during the antiskid control operation from the pressure source. For this purpose, the brake system includes a valve device that makes available at its outlet a pressure corresponding to the pressure in the working chambers of the master cylinder. This device ensures that the pressure fluid removed during the antiskid control action will be replenished from an independent reservoir. In case of need, the pressure fluid is fed into the brake circuits through check valves which are adapted to be opened in opposition to the master cylinder pressure. Connected upstream of the valve device is another valve which is closed in its de-energized state and which is opened as soon as one of the relief valves, which are arranged at the wheel brakes, switches over to its open position. The position of the normally closed other valve, which is assigned to the valve device, is further dependent upon the outlet pressure of the valve device. In this manner, it is ensured that the connection between the pressure source and the valve device will be interrupted only when the pressure in the working chambers of the tandem master cylinder has been completely decreased.

As advantageous as this arrangement may be in many respects, it still leaves much to be desired in other respects. So for instance, it necessitates a comparatively complicated and costly design of the normally closed other valve which is associated with the valve device. Apart from several radial bores, the control piston of the valve device also includes in its interior control channels, which results in a situation where intensive machining of this part is required. As mentioned already, the pressure at the outlet of the valve device exactly corresponds to the pressure built up in the working chambers of the tandem master cylinder.

SUMMARY OF THE INVENTION

Accordingly, it is a general object of the present invention to avoid the disadvantages of the prior art.

More particularly, it is an object of the invention to provide a control arrangement for use in a vehicular braking system, especially such equipped with an antiskid device, which is not possessed of the disadvantages of the conventional arrangements of this type.

An additional object of the present invention is to provide a simple hydraulic brake system of the type here under consideration, wherein the valve design is simplified and the valve device has such structure as to permit the use of an ordinary control piston which has been machined only on its surface.

Still another object of the present invention is to so construct the control arrangement as to assure that a sufficient fluid reserve will be present in the working chambers of the master cylinder under all circumstances.

It is a concomitant object of the present invention to so design the control arrangement as to be simple in construction, inexpensive to manufacture, and reliable in operation nevertheless.

In pursuance of these objects and others which will become apparent hereafter, one feature of the present invention resides in a control arrangement for use in a hydraulic braking system, especially in a vehicular braking system equipped with an antiskid device, between a pressure source, at least one braking circuit leading to at least one wheel brake actuating cylinder, and a return conduit leading to a hydraulic fluid reservoir, in a combination comprising a valve device including a housing defining a bore and a control piston received in the bore for movement axially thereof between a closing and opening position; means for biasing the control piston toward the closing position including a spring and means for transmitting the force of the spring to the control piston, including an auxiliary piston having one axial end surface facing away from the spring; means for causing pressurized hydraulic fluid from the pressure source to act on the one end surface of the auxiliary piston upon brake pedal actuation to counteract the action of the spring on the auxiliary piston; and means for urging the control piston toward the opening position, including means for supplying pressure prevailing in the return conduit to the control piston to act thereon in direction toward the opening position. Advantageously, a control valve is interposed in the return conduit.

When the control arrangement is constructed in this manner, there is obtained the advantage that a number of solenoid-controlling valves can be omitted. A closing mechanism is constituted by the piston which is spring-loaded on one side, which mechanism will permit the valve device to open only in the event of actuation of the brake pedal. For this purpose, the auxiliary piston is advantageously in hydraulic communication with the booster chamber of the hydraulic brake booster. As soon as pressure fluid is admitted into the booster chamber, the auxiliary piston travels to its operating position thereby fulfilling the preconditions for the valve device to become effective. The control piston is now in a state of readiness and is able to immediately commence supply of replenishment pressure fluid once pressure fluid is discharged from the wheel brakes. For this purpose, a pressure-limiting valve is inserted in the return conduit which, as pressure fluid flows back from the brakes into the reservoir, builds up a pressure which is low compared to the braking pressure and which acts on an end surface of the previously balanced control piston of the valve device, so that the control piston changes into a position which results in establishment of communication between the booster chamber of the hydraulic brake booster and the working chambers of the tandem master cylinder.

It is expedient to keep the pressure level in the return conduit at a comparatively low level in order not to unnecessarily slow down the speed of pressure decrease in the wheel brakes. It is advisable to adjust the pressure level in the return conduit to approximately 2 bar. In general, the pressure in the return line as determined by the pressure-limiting valve is maintained at a level only marginally exceeding that needed for overcoming the friction forces acting on the control piston.

In a particularly advantageous embodiment of the valve device, the control piston is slidably guided in a housing having an inlet port and an outlet port and a communication is established between the inlet port and the outlet port via a recess of the control piston. In this manner, there is obtained a control piston configuration which merely requires machining of the control piston at its external surface.

An advantageous embodiment of the brake system in accordance with the present invention is obtained when the inlet port is connected to the booster chamber of the hydraulic brake booster and the outlet port is connected via check valve to working chambers of the master cylinder, so that the check valves are opened in opposition to the master-cylinder pressure. This measure ensures that pressure fluid is supplied from the booster chamber of the hydraulic brake booster only in the event that the pressure in the working chambers of the tandem master cylinder drops below the level of the booster pressure. It is thereby avoided that the master cylinder pressures would be affected in those cases in which this is not true.

In order to guarantee a complete pressure decrease within the system after a braking action with antiskid control, the housing of the valve device is provided with a return port which communicates in the closing position with the outlet port. In other words, the outlet of the valve device to which the check valves are attached is via a return conduit which is in permanent connection with a low-pressure return reservoir in the absence of brake actuation.

In another advantageous embodiment, the control piston is held in its closing position in the absence of brake actuation by a tappet formed at the auxiliary piston and by a stop rigid with the housing. As a result of this, the valve device will be given a defined position ensuring its operability in the event of a sudden change in pressure in extreme situations.

It is expedient from a technical point of view to dimension the diameter of the control piston end surface which is adapted to be subjected to pressure smaller than the end surface of the auxiliary piston. Under these conditions, the auxiliary piston assumes its operating position already at very low pressures in the booster chamber. The locking of the control piston in position by the auxiliary piston is already discontinued in this operating position. This arrangement assures that, during braking actions when the driver has first commenced to brake cautiously and then initiates the full braking operation, the control piston is capable of being urged into its open position more quickly, since the auxiliary piston has already become ineffective.

It is advantageous to design the brake system in accordance with the present invention so that the effective ratio of booster-piston surface and master-cylinder-piston surface are such that the restoring forces of the pressure prevailing in the working chambers of the master cylinder are at least equal to the thrust power of the booster piston. As a result of this, a slow movement of the brake pedal through its full travel, as occurs in other devices under certain circumstances, is prevented. Furthermore, it is possible and desirable in special cases to so dimension the pistons as to have a greater magnitude of the restoring pressures in the tandem master cylinder as compared to the thrust force in the brake booster, so that there is obtained a release movement of the brake pedal.

BRIEF DESCRIPTION OF THE DRAWING

Above-mentioned and other features and objects of this invention will become more apparent by reference to the following description taken in conjunction with accompanying drawing, in which: the sole FIGURE is a diagrammatic partly sectioned view of a hydraulic braking system incorporating the control arrangement of the present invention.

DETAILED DESCRIPTION OF THE PREFERRED EMBODIMENT

Referring now to the drawing in detail, it may be seen that the reference numeral 1 identifies a tandem master cylinder and the reference numeral 2 a hydraulic brake booster. The hydraulic brake booster 2 has an inlet port 3 communicating with a pressure source 4 which is illustrated The hydraulic brake booster 2 has an inlet port 3 illustrated in the drawing as a pressure accumulator arrangement and which may incorporate a pressure fluid pump, an accumulator-charging valve and the actual pressure accumulator. The actuation of the hydraulic brake booster 2 is effected by a brake pedal 5 acting via a push rod 6 and an actuation piston 7 on a control sliding element 8 of the hydraulic brake booster 2. In the shown inactive position of the device, connection is established between a booster chamber 9 and a return reservoir 10. The interior of the reservoir 10 is subdivided into three chambers 11, 12, 13. In the illustrated embodiment, the chambers 11 and 12 are connected to working chambers 16, 17 of the tandem master cylinder via intake ports 14, 15. The chamber 13 is primarily intended for keeping a sufficient amount of pressure fluid available for the pressure fluid pump which has not been shown in detail. Besides, the device comprising the tandem master cylinder 1 and the hydraulic brake booster 2 includes two master cylinder pistons 18, 19 and one booster piston 20.

The working chambers 16, 17 of the tandem master cylinder 1 communicate via valves 21 and 22, which are open in their de-energized state, and via corresponding pressure conduits, with respective wheel brakes 23, 24, 25, and 26. Consequently, the pressure in two wheel brakes 23, 24 and 25, 26, respectively, is determined by a respectively associated normally open valve 21 or 22. Moreover, a valve 27, which is closed in its de-energized state, is connected to the wheel brakes 23, 24 this valve 27 rendering it possible to establish a connection between the wheel brakes 23, 24 and a return conduit 28. Similarly, another valve 29, which closed in its deenergized state, is connected to the wheel brakes 25, 26.

The normally open valves 21, 22 and the normally closed valves 27, 29, are controlled by a non-illustrated electronic control unit receiving its data from sensors assigned to the wheels. The electronic control unit, which is of a conventional construction not forming a part of the present invention, recognizes from the sensor signals at an early point of time a tendency of one or several wheels to lock and, under such circumstances, it will issue specific control commands to the valves 21, 22, 27, 29 in response to which the pressure in the wheel brakes 23, 24, 25, 26 will be decreased or increased according to the instantaneous wheel condition. This control action is continued until the danger of imminent locked condition of the respective wheel or wheels has been overcome.

The return line 28 connects the normally closed valves 27, 29 to the chamber 11 of the return reservoir 10. Inserted in the return line 28 is a pressure-limiting valve 30 which raises the pressure of the fluid flowing through the return line 28 to approximately 2 bar. This pressure is small compared with the braking pressure so that no appreciable resistance is presented to the removal of pressure fluid from the wheel brakes 23, 24, 25, 26. The rate of pressure decrease at the wheel brakes 23, 24, 25, 26 is thus reduced to a barely noticeable degree by the pressure-limiting valve 30.

Assigned to the brake system described herein is furthermore a valve device 31 communicating via a pressure conduit with the booster chamber 9 of the hydraulic brake booster 2. The valve device 31 comprises a housing 32 having two cylinder bores 33, 34 arranged in series in an axial direction. An auxiliary piston 35 is guided in the cylinder bore 34 which is shown at the right-hand side in the drawing. The end surface of the auxiliary piston 35 which faces to the right, as considered in the drawing, cooperates with parts of the housing 32 to form a chamber 38 which is in permanent communication with the return reservoir 10 via corresponding pressure conduits. A compression spring 39 is located in this chamber 38 and its force acts upon the auxiliary piston 35 in the direction toward the cylinder bore 33 which is shown at the left-hand side in the drawing. That end face 40 of the auxiliary piston 35 which faces to the left, as considered in the drawing, cooperates with parts of the housing 32 to form another chamber 41 which communicates with the booster chamber 9 of the hydraulic brake booster 2. The compression spring 39 has a comparatively low spring constant so that piston displacement in the right-ward direction, as considered in the drawing, starts already at relatively low pressures in the booster chamber 9. On the other hand, the compression spring 39 must be so strong as to be able to return the auxiliary piston 35 to its initial position in opposition to the friction forces of the sealing material when the pressure in the chamber 41 is relieved. Formed at the end surface 40 of the auxiliary piston 35 is a tappet 42 extending normal to the end surface 40. The tappet 42 extends through a bore 44 connecting the cylinder bore 34 with the cylinder bore 33, being fluid-tightly guided therein. The tappet 42 has such a length that its free end constitutes a first axial stop for a control piston 43 in the illustrated inactive position of the valve device 31. As soon as pressure fluid is admitted into the chamber 41, the free end of the tappet 42 moves so far to the right, as considered in the drawing, that its free end is retracted into the bore 44 connecting the cylinder bores 33, 34.

The valve device 31 is provided with a second stop 45 rigid with the housing 32 which provides for a well-defined position of the control piston 43 in the illustrated inactive position. An annular chamber 46 is formed in the wall of the cylinder bore 33. The chamber 46 is also in communication with the booster chamber 9 of the hydraulic brake booster 2. In the illustrated closing position of the valve device 31, an annular groove 47 of the control piston 43 is in alignment with the annular chamber 46 of the cylinder bore 33. The control piston 43 further has a stepped end portion 48 which establishes connection between an outlet port 49 and a return port 50 in the illustrated position. The return port 50 communicates via a return conduit with the chamber 11 of the return reservoir 10. There are also provided connecting conduits between the outlet port 49 and the pressure conduits which connect the working chambers 16, 17 of the tandem master cylinder 1 to the normally open valves 21, 22. Check valves 51, 52 are inserted in such connecting conduits in such a manner that pressure fluid flow is possible exclusively from the outlet channel 49 to the working chambers 16, 17 of the master cylinder 1 or to the normally open valves 21, 22.

The mode of operation of the braking system described is as follows: When force is applied on the brake pedal 5, the control sliding element 8 of the hydraulic brake booster 2 moves to the left, as considered in the drawing, and thereby interrupts the connection between the booster chamber 9 and the chamber 13 of the return reservoir 10. Upon further movement of the control sliding element 8, channels in the control sliding element and in the booster piston 20 are brought into alignment in a known manner so that pressure fluid is allowed to flow from the pressure source 4 into the booster chamber 9. This booster pressure exerts a force on the effective surface of the booster piston 20 which displaces the booster piston 20 in the actuating direction. Displacement of the booster piston 20 is transmitted via appropriate connecting elements to the master cylinder pistons 18, 19 which will move beyond the intake ports 14, 15 and then develop a corresponding hydraulic pressure in the working chambers 16, 17. The pressure developed in the working chambers 16, 17 propagates via the normally open valves 21, 22 through the respective pressure conduits or braking circuits to the wheel brakes 23, 24, 25, 26. Simultaneously, the pressure fluid admitted into the booster chamber 9 is supplied to the chamber 41 of the valve device 31, causing displacement of the auxiliary piston 35 to the right, as considered in the drawing, in opposition to the force of the compression spring 39, thus causing retraction of the tappet 42 formed at the auxiliary piston 35 into the connecting bore 44. As a result of this, the control piston 43 is in a state of readiness in which both end surfaces are pressure-balanced.

When the electric control unit senses an imminent locked wheel condition, one or both of the normally open valves 21, 22 will be switched over so that connection is interrupted between the working chambers 16, 17 of the tandem master cylinder 1 and the wheel brakes 23, 24; 25, 26. If the anti-skid control unit recognizes a need for a pressure decrease in the wheel brakes 23, 24; 25, 26, even the normally closed valves 27, 29 will switch into their open positions so that pressure fluid is discharged from the wheel brakes 23, 24, 25, 26 via the now open valves 27, 29 and via the pressure-limiting valve 30 through the return conduit to the reservoir 10.

It has been assumed in the embodiment shown, that two wheel brakes 23, 24 and 25, 26 are respectively jointly controlled by a valve combination 21, 27 or 22, 29. The present invention, however, can also be used to the same extent in brake systems incorporating such antiskid brake slip control devices in which each vehicle wheel brake is individually controlled or in which the rear wheels are controlled jointly while the front wheels are controlled independently of one another.

As soon as pressure fluid is returned via the return line 28 to the return reservoir 10 in the event of a pressure fluid discharge from the wheel brakes 23, 24, 25, 26, the pressure in the return conduit 28 will rise up to the limit determined by the pressure-limiting valve 30. This pressure propagates to the valve device 31 and acts thereon the leftwardly facing end surface of the control piston 43, as considered in the drawing, so that the control piston 43 is shifted away from the stop 45 which is rigid with the housing 32 and is moved into its opening position in which its rightwardly facing surface abuts an abutment surface of the housing 32. In this opening position of the control piston 43 connection is established between the inlet port 46 and the outlet port 49, while connection between the outlet port 49 and the return port 50 is interrupted. As a result of suitable adjustment of the pressure-limiting valve 30, the pressure prevailing in the return line 28 is of such a magnitude that the action thereof on the control piston 43 moves the latter into its opening position in opposition to the friction forces of the sealing material. A pressure within the range of approximately 2 bar is sufficient to achieve this purpose. This pressure, which is low as commmpared with the braking pressure, affects the rate of pressure decrease in the wheel brakes 23, 24, 25, 26 to an only immaterial degree.

When the vehicle wheels have escaped the imminent locked condition as a result of a sufficient pressure decrease in the respective wheel brakes 23, 24, 25, 26, the valves 21, 22, 27, 29 will be switched back into their inactive positions permitting a new pressure build-up in the wheel brakes 23, 24, 25, 26. However, due to the preceding pressure fluid removal from the brakes 23, 24, 25, 26, pressure fluid has to be supplied first into the brake circuits before it is possible to achieve a pressure build-up. If this replenishment pressure fluid were to be supplied from the working chambers 16, 17 of the tandem master cylinder 1, this would result in a further downward travel of the brake pedal 5. However, the pressure in the connecting conduits between the working chambers 16, 17 and the normally open valves 21, 22 is lower at the time of de-energization of the valves 21, 22 than the pressure at the outlet port 49 so that the check valves 51, 52 will open and replenishment pressure fluid will flow into the respective braking circuit via the valve device 31. This measure ensures that the master cylinder pistons 18, 19 maintain their axial position during the antiskid control operation. As soon as the pressure in the wheel brakes 23, 24, 25, 26 has again increased to such an extent that the locking of the wheels becomes immineant a new antiskid control action is started. In the event of failure of the pressure source 4, the above-described brake system operates as a conventional brake system with a tandem master cylinder. Wherein the electronic control unit detects the failure of the pressure source 4, it will not initiate the antiskid control operation so that the valves 21, 22, 27 and 29 will retain their de-energized states, that is, the valves 21, 22 will remain open and the valves 27, 29 will remain closed. There is no auxiliary pressure admitted into the booster chamber 9 in the case of failure. Consequently, the auxiliary piston 35 will remain in its inactive position in which the control piston 43 is maintained in its inactive or closing position as well.

While I have described above the principles of my invention in connection with specific apparatus, it is to be clearly understood that this description is made only by way of example and not as limitation to the scope of my invention as set forth in the accompanying claims.

I claim:

1. A control arrangement for use in a hydraulic braking system, especially in a vehicular braking system equipped with an antiskid device, between a pressure source, at least one braking circuit leading to at least one wheel brake actuating cylinder, and a return conduit leading to a hydraulic fluid reservoir and including means for creating a pressure in said return conduit, comprising:

a valve device including a housing defining a bore and a control piston received in said bore for movement axially thereof between a closing and opening position;

means for biasing said control piston toward said closing position including a spring and means for transmitting the force of said spring to said control piston, including an auxiliary piston having an axial end surface facing away from said spring;

means for causing pressurized hydraulic fluid from the pressure source to act of said end surface of said auxiliary piston upon brake pedal actuation to counteract the action of said spring on said auxiliary piston;

means for urging said control piston toward said opening position, including means for supplying pressure prevailing in the return conduit to said control piston to act thereon in direction toward said opening position and further including means responsive to the opening of said control piston for admitting pressurized fluid from said pressure source to said braking circuit;

wherein said return conduit includes a branch commencing at the wheel brake actuating cylinder and further comprising a control valve interposed in said branch; and further comprising a pressure-limiting valve interposed in said branch.

2. The control arrangement as defined in claim 1, wherein said urging means includes means for communicating said bore of said valve device with said branch upstream of said pressure limiting valve.

3. A control arrangement for use in a hydraulic braking system, especially in a vehicular braking system equipped with an antiskid device, between a pressure source, at least one braking circuit leading to at least one wheel brake actuating cylinder, and a return conduit leading to a hydraulic fluid reservoir and including means for creating a pressure in said return conduit, comprising:

a valve device including a housing defining a bore and a control piston received in said bore for movement axially thereof between a closing and opening position;

means for biasing said control piston toward said closing position including a spring and means for transmitting the force of said spring to said control piston, including an auxiliary piston having an axial end surface facing away from said spring;

means for causing pressurized hydraulic fluid from the pressure source to act of said end surface of said auxiliary piston upon brake pedal actuation to counteract the action of said spring on said auxiliary piston;

means for urging said control piston toward said opening position, including means for supplying pressure prevailing in the return conduit to said control piston to act thereon in direction toward said opening position and further including means responsive to the opening of said control piston for admitting pressurized fluid from said pressure source to said braking circuit; and further comprising a pressure-limiting valve in said return conduit.

4. The control arrangement as defined in claim 3, wherein said pressure-limiting valve limits the pressure upstream thereof to a value up to 2 bar.

* * * * *